(12) United States Patent
Keller et al.

(10) Patent No.: US 8,066,330 B2
(45) Date of Patent: Nov. 29, 2011

(54) MOTOR-VEHICLE HEADREST

(75) Inventors: Hubert Keller, Amberg (DE); Markus Hoffmann, Kummersbruck (DE)

(73) Assignee: Grammer AG, Amberg (DE)

( * ) Notice: Subject to any disclaimer, the term of this patent is extended or adjusted under 35 U.S.C. 154(b) by 407 days.

(21) Appl. No.: 11/807,904

(22) Filed: May 30, 2007

(65) Prior Publication Data

US 2007/0284929 A1  Dec. 13, 2007

(30) Foreign Application Priority Data

May 31, 2006 (DE) .......................... 10 2006 025 741
Jun. 13, 2006 (DE) .......................... 10 2006 027 646

(51) Int. Cl.
*A47C 7/36* (2006.01)

(52) U.S. Cl. ........................................ 297/408; 297/403

(58) Field of Classification Search ................. 297/408, 297/403

See application file for complete search history.

(56) References Cited

U.S. PATENT DOCUMENTS

| 4,266,760 | A | * | 5/1981 | Matsui et al. | 297/408 X |
| 4,779,929 | A | * | 10/1988 | Kuchemann | 297/408 X |
| 5,826,942 | A | | 10/1998 | Sutton | 297/378 |
| 6,000,760 | A | * | 12/1999 | Chung | 297/408 |
| 6,299,254 | B1 | * | 10/2001 | Dinh et al. | 297/408 |
| 6,302,485 | B1 | * | 10/2001 | Nakane et al. | 297/408 |
| 7,413,253 | B2 | * | 8/2008 | Karlberg | 297/408 X |
| 2005/0242640 | A1 | | 11/2005 | Barko | 29/338 |

FOREIGN PATENT DOCUMENTS

| DE | 20207115 | 10/2002 |
| DE | 102 36 259 | 2/2004 |
| DE | 10256642 | 6/2004 |
| DE | 202004004251 | 6/2005 |

* cited by examiner

*Primary Examiner* — Anthony D Barfield
(74) *Attorney, Agent, or Firm* — Andrew Wilford

(57) ABSTRACT

A motor-vehicle headrest has an upright rod having upper and lower ends, a cushion support pivotal on the upper rod end about a generally horizontal axis between a use position and an stowage position, and a stop fixed on the rod upper end. A latch element is pivotal in the support between a retaining position engaging the stop and preventing pivoting of the support and a freeing position clear of the stop and permitting pivoting of the support.

13 Claims, 6 Drawing Sheets

MOTOR-VEHICLE HEADREST

FIELD OF THE INVENTION

The present invention relates to a motor-vehicle headrest. More particularly this invention concerns such a headrest that can pivot about a horizontal axis and also move up and down.

BACKGROUND OF THE INVENTION

A headrest is known from DE 102 36 259. It has a cushion support mounted on support rods attached to the seat back so as to pivot about a pivot axis. The cushion support may be pivoted between a use position and a stowage or non-use position. In the use position the cushion support forms an upright support surface for the head of the vehicle occupant, and in the stowage position the cushion can be dropped and nested against the top of the seat back. By pivoting the cushion support of a headrest in the rear seat of a vehicle into the stowage position, the driver has better visibility through the rear window when no passengers are in the vehicle.

The headrest may be latched in the use position to prevent unintended pivoting of the cushion support. The headrest may be unlatched by pressing on an actuating bar, thereby shifting a latch element in a translational or straight-line movement from the latched or holding position in which the headrest cannot pivot to the released or freeing position in which the headrest cannot pivot about its horizontal axis.

Another headrest is described in DE 20 2004 004 251 where the cushion support is pivoted on a support bow and may be latched in a use position and a stowage position. A latching pin displaceable in a straight-line manner longitudinally of its axis is mounted on the cushion support. An end of the latching pin has an tip can fit in recesses in a latching disk attached to the support bow. The latching pin may be moved out of the recess in the latching disk in a straight-line manner by pressing an actuating button, thereby releasing the latch and allowing the cushion support to pivot.

A principle problem with both of these systems is that, in a crash, it is possible that the vehicle will be subjected to a sudden acceleration or deceleration in a direction parallel to the actuation direction of the latch element. This will unlatch the cushion support so it can pivot into a position in which it either offers no more meaningful bracing of the passenger's head, or even into a position where it is hazardous when, for instance, the passenger rebounds against it.

OBJECTS OF THE INVENTION

It is therefore an object of the present invention to provide an improved motor-vehicle headrest.

Another object is the provision of such an improved that overcomes the above-given disadvantages, in particular that stays latched even in the event of an accident.

A further object is to provide an improved headrest of simple but safe construction.

SUMMARY OF THE INVENTION

A motor-vehicle headrest has according to the invention an upright rod having upper and lower ends, a cushion support pivotal on the upper rod end about a generally horizontal axis between a use position and an stowage position, and a stop fixed on the rod upper end. According to the invention a latch element is pivotal in the support between a retaining position engaging the stop and preventing pivoting of the support and a freeing position clear of the stop and permitting pivoting of the support.

According to the invention the "latch" is a device by means of which the cushion support may be releasably latched, at least in the use position. Of course, the cushion support may also be releasably latched in both the use position and the stowage position, and optionally in an intermediate position as well.

The advantage of the invention is that the latch element may be designed in such a way that its center of gravity is located at or near its rotation axis. In this manner, in a collision it is not possible for the latch element to accidentally move into the released position as the result of inertial forces and thereby pivot. The headrest according to the invention also provides a high level of safety due to the ability of the pivotable latch element to transmit large retention forces. As a result of its simple design the headrest has high functional reliability.

The actuating path and the actuating force are made inversely proportional to one another by use of the rotary latch element. As the distance from the pivot bearing increases, the actuating force necessary to actuate a spring-loaded pivot latch, for example, decreases. The closer the actuation to the rotation axis, the smaller the actuating path that is required for pivoting the latch element at a given distance from the pivot axis.

The risk of jamming the latch, which may occur, for example, in a latch guided in a straight-line manner, is not present for the latch element. Thus, no precautions are necessary to avoid this so-called "drawer effect."

According to a first embodiment, the center of gravity of the latch element is located at or near the rotation axis. As described above, this embodiment prevents unintended pivoting of the latch element. Thus, it is not necessary to prevent the latch element from pivoting, such as by the use of stiff springs.

According to a further embodiment of the invention the latch element is formed by a disk, for example stamped out of sheet metal, which is a particularly cheap manufacturing method. Large retaining forces may be transmitted via the outer surfaces. In addition, the disk takes up only a small amount of space inside the cushion support. It may also be very light.

According to a further embodiment of the invention the latch disk is basically circular. In this manner the latch element may easily be designed so that the center of gravity is located on its rotation axis, thereby preventing the latch element, when subjected to inertial forces, from accidentally pivoting. A circular disk, for example, forms a large outer surface over which retention forces may be transmitted, and with which actuating elements as well as a restoring spring may engage.

According to a further embodiment of the invention, the stop has at least one stop surface that in the latched position cooperates with at least one outer surface region of the latch element. Large retention forces may be transmitted in particular by designing the stop surface with a large surface area.

According to a yet another embodiment of the invention the stop has at least one slot or opening, of which at least one inner surface forms the stop surface for the latch element. In the latched position the latch element is thus positioned inside the opening. The stop surface of the stop and the counter surface of the latch element cooperate in a latching manner. The latch element is moved out of the opening by pivoting the latch element, causing the stop surface and the counter surface to disengage and thus allowing the cushion support to pivot.

According to a further embodiment, the latch element has slots opening at its outer edge. As a result, it is necessary to pivot the latch element only slightly in order to move it between the latched and the released positions. In addition, the actuating elements may then be designed so that they have only small displacement paths.

According to a further embodiment, the latch element has at least one actuating region that cooperates with an actuating element for pivoting the latch element. The actuating region may be formed, for example, by a surface that is in contact with the actuating element and through which angular force may be transmitted to the latch element.

According to a further embodiment, the actuating element is formed by an electromagnetically actuated plunger. By use of the electromagnet it is possible, for example, for the latch element to be moved from the latched to the released position from the driver's seat, since the electromagnet may be actuated remotely via an electrical signal.

According to a further embodiment of the invention, the actuating element is formed by a straight-line actuatable slide that allows the latch element to be manually actuated. The slide may, for example, be actuatable against the force of a spring, and may exert a force on the actuating region that causes the latch element to pivot.

According to a further embodiment of the invention a spring is associated with the latch element so that it may be moved against the force of this spring from the latched to the released position. The latch element is thereby held in the latched position by the spring and can be pivoted against the force of the spring into the released position.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
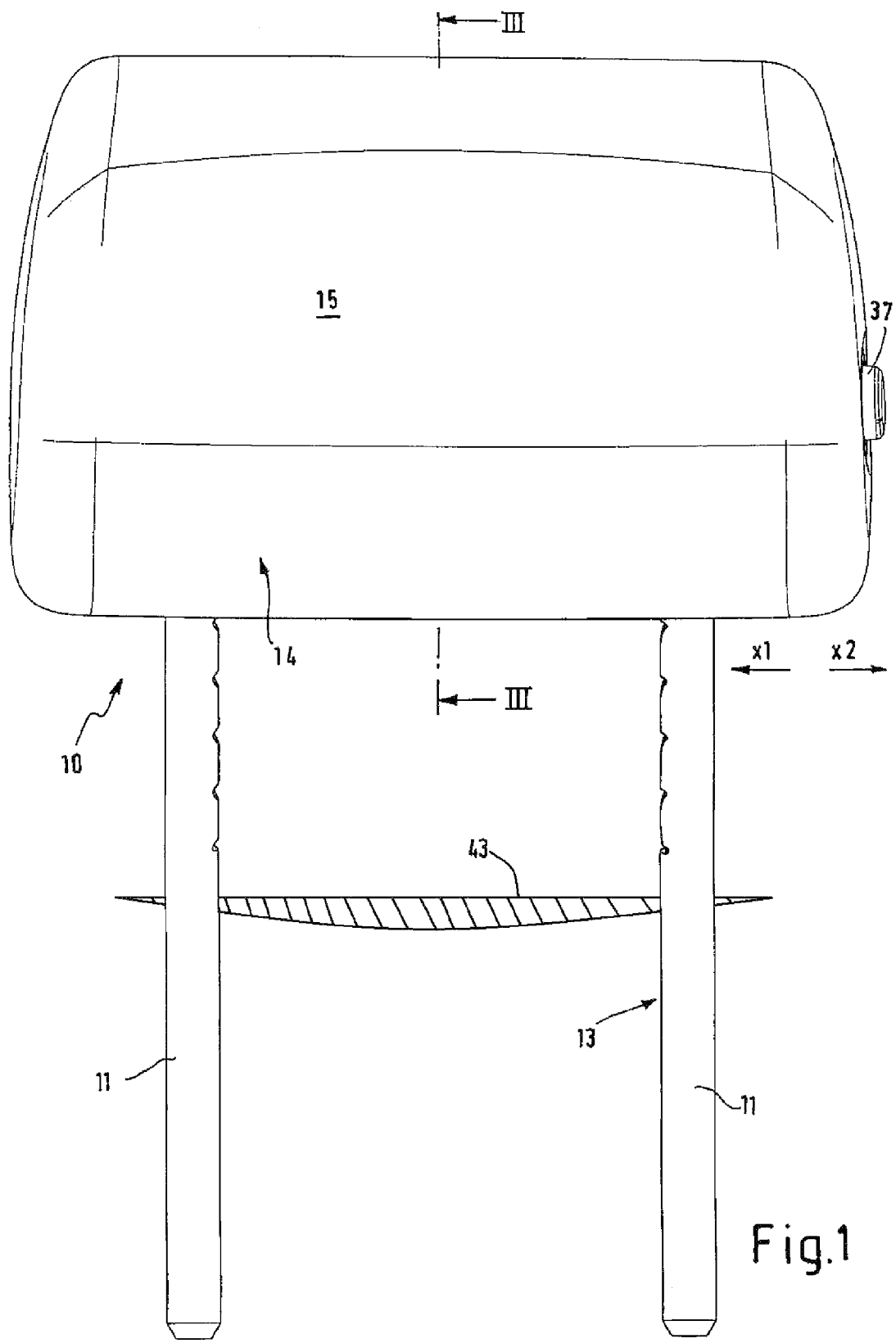
FIG. 1 is a front view of the headrest according to the invention in the use position.
Figure 2:
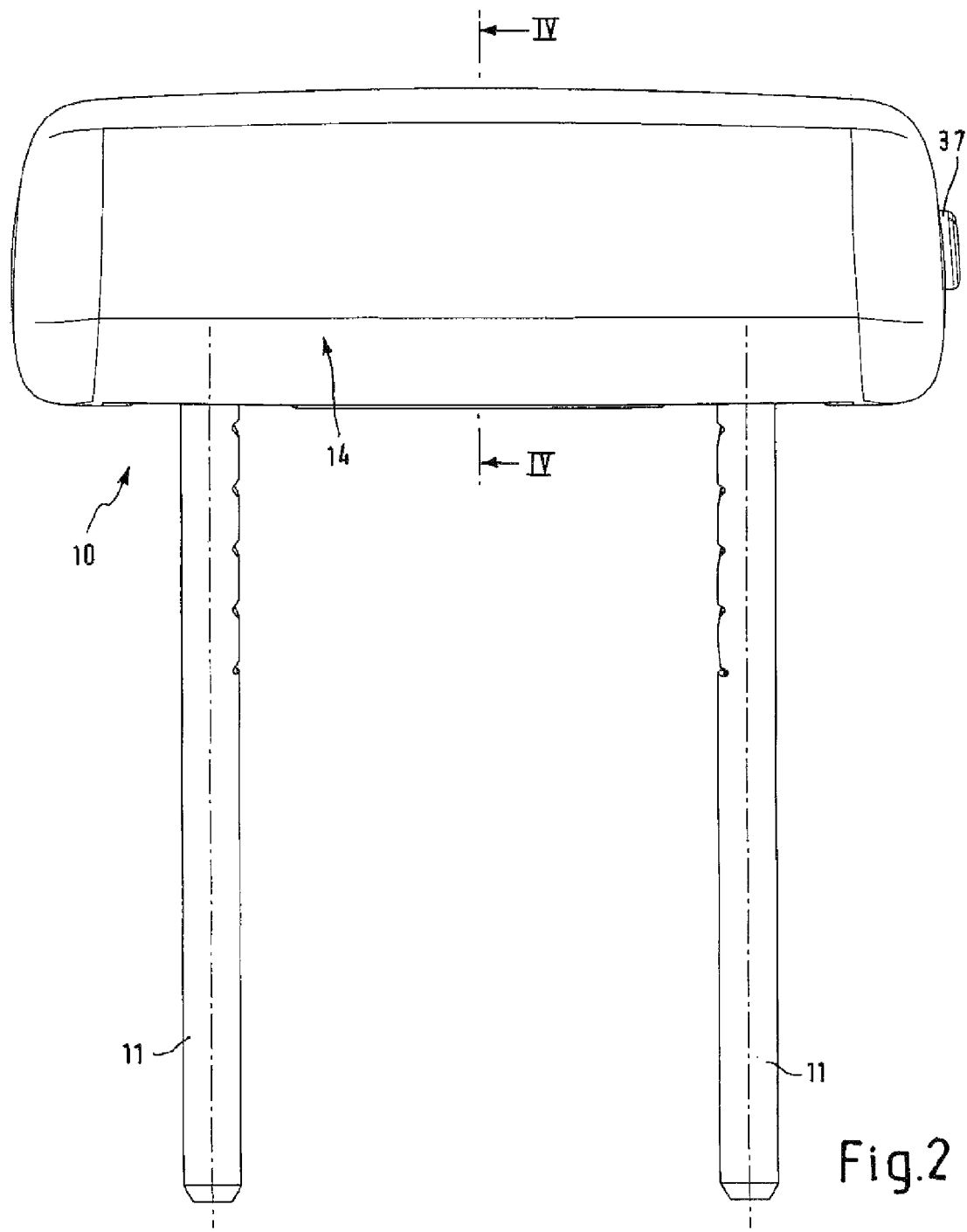
FIG. 2 is a view like FIG. 1 but in the stowage position.

As seen in FIG. 1, the headrest 10 has a support bow 13 having two parallel and normally vertical support rods 11 that have lower ends fixed in sockets in a vehicle seat back shown schematically at 43. A cushion support 14 is carried on a horizontal crosspiece 12 of the support bow 13. In a use position of the cushion support 14 according to FIG. 1, a front face 15 serves as the support surface for the head of a vehicle occupant (not illustrated). The cushion support 14 may be pivoted from the use position illustrated in FIGS. 1 and 3 to a stowage position according to FIGS. 2 and 4, for example to provide the driver with better visibility through the rear window when no passengers are in the back seat of the vehicle, especially if the headrest 10 is dropped down against the top of the vehicle seat back 43.

Figure 3:
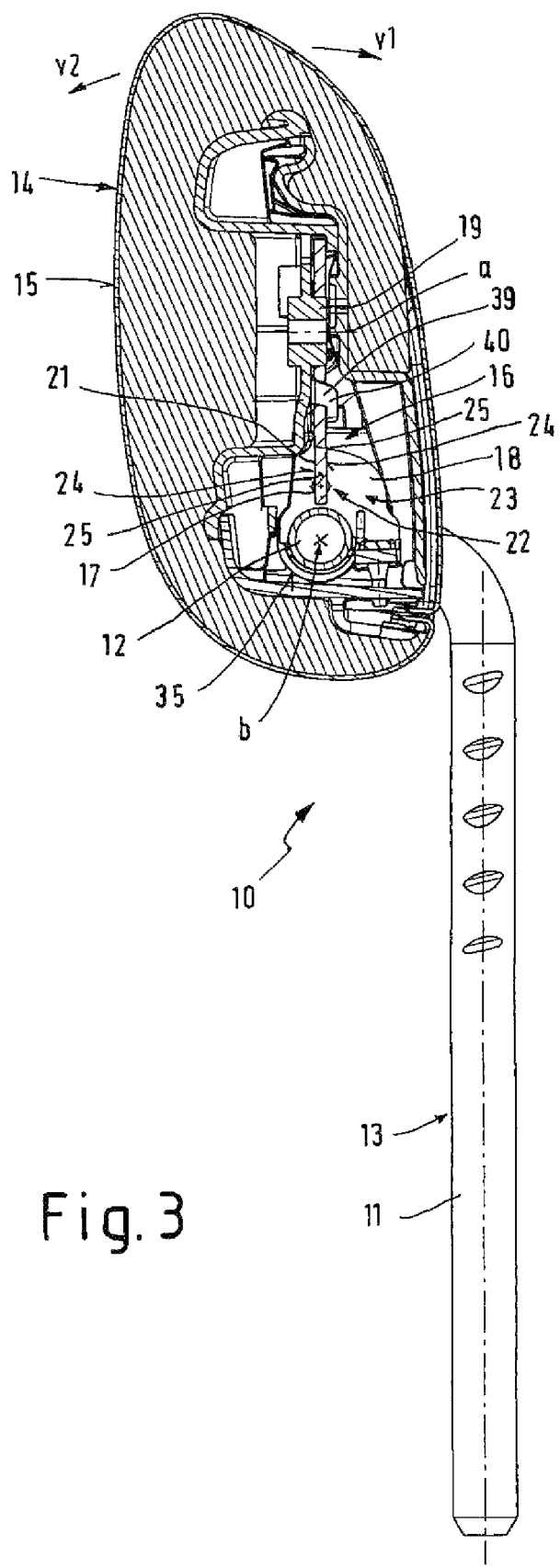
FIGS. 3 and 4 are vertical cross sections taken respectively along lines III-III and IV-IV of FIGS. 1 and 2.
Figure 4:
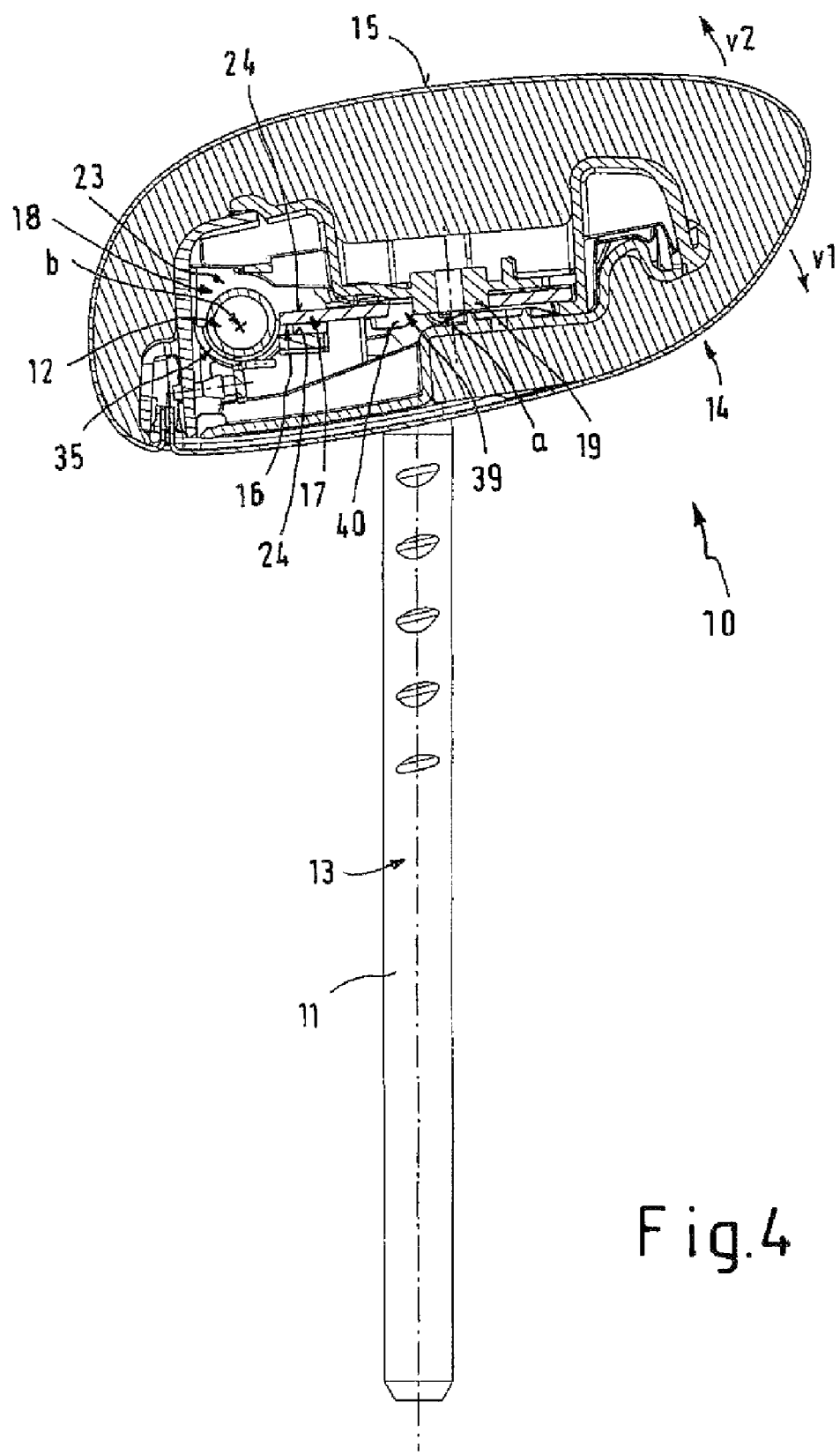

To prevent unintended pivoting of the cushion support 14, according to FIG. 3 the headrest 10 has a latch 16 comprising a rotatable latch element or disk 17 and a stop 18 welded to the crosspiece 12 for the support bow 13, which itself forms a horizontal pivot axis b for the cushion support 14. FIG. 3 illustrates the latch element 17 in a latched position, which is described below with reference to FIG. 5.

The latch element 17 is supported on a pivot 19 attached to a mounting plate 20 so as to be rotatable about an axis a that is horizontal but that lies in a vertical plane perpendicular to the axis b. The mounting plate 20 is fixed to the cushion support 14. In the latched position of the element 17 according to FIG. 5, segments 21 of the element.17 fit in slots 22 in arms 23 of the bracket-shaped stop 18. According to FIG. 3, outer surfaces 24 of the latch-element segments 21 form stop surfaces that cooperate with counter surfaces 25 formed by inner surfaces of the slots 22. Therefore, the cushion support 14 is not able to pivot in either pivot direction v1 or opposite pivot direction v2 (see FIGS. 3 and 4).

Figure 5:
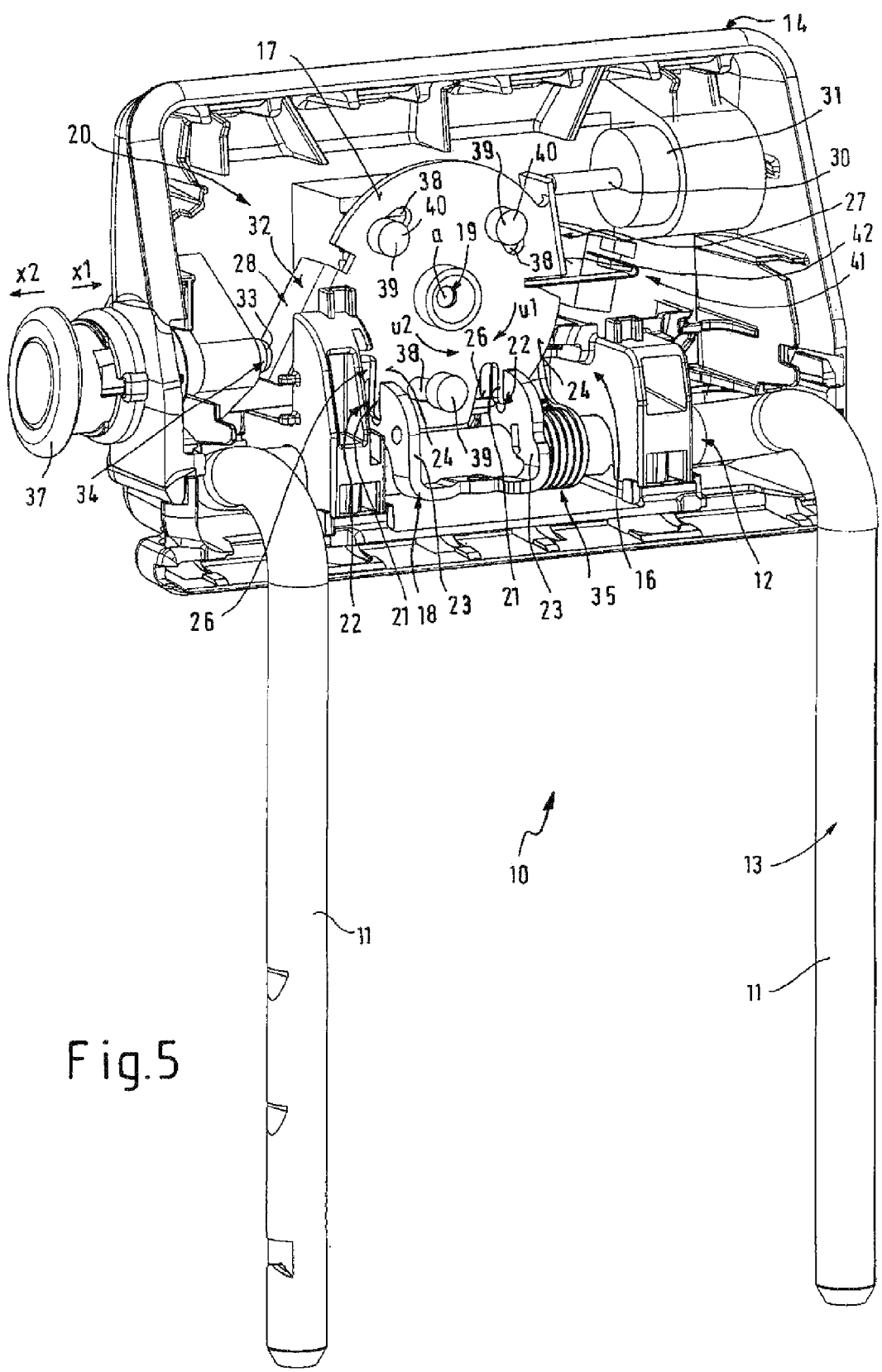
FIG. 5 is a rear view of the headrest with a latched cushion support, a rear shell of the cushion support not being illustrated for clarity of view.
Figure 6:
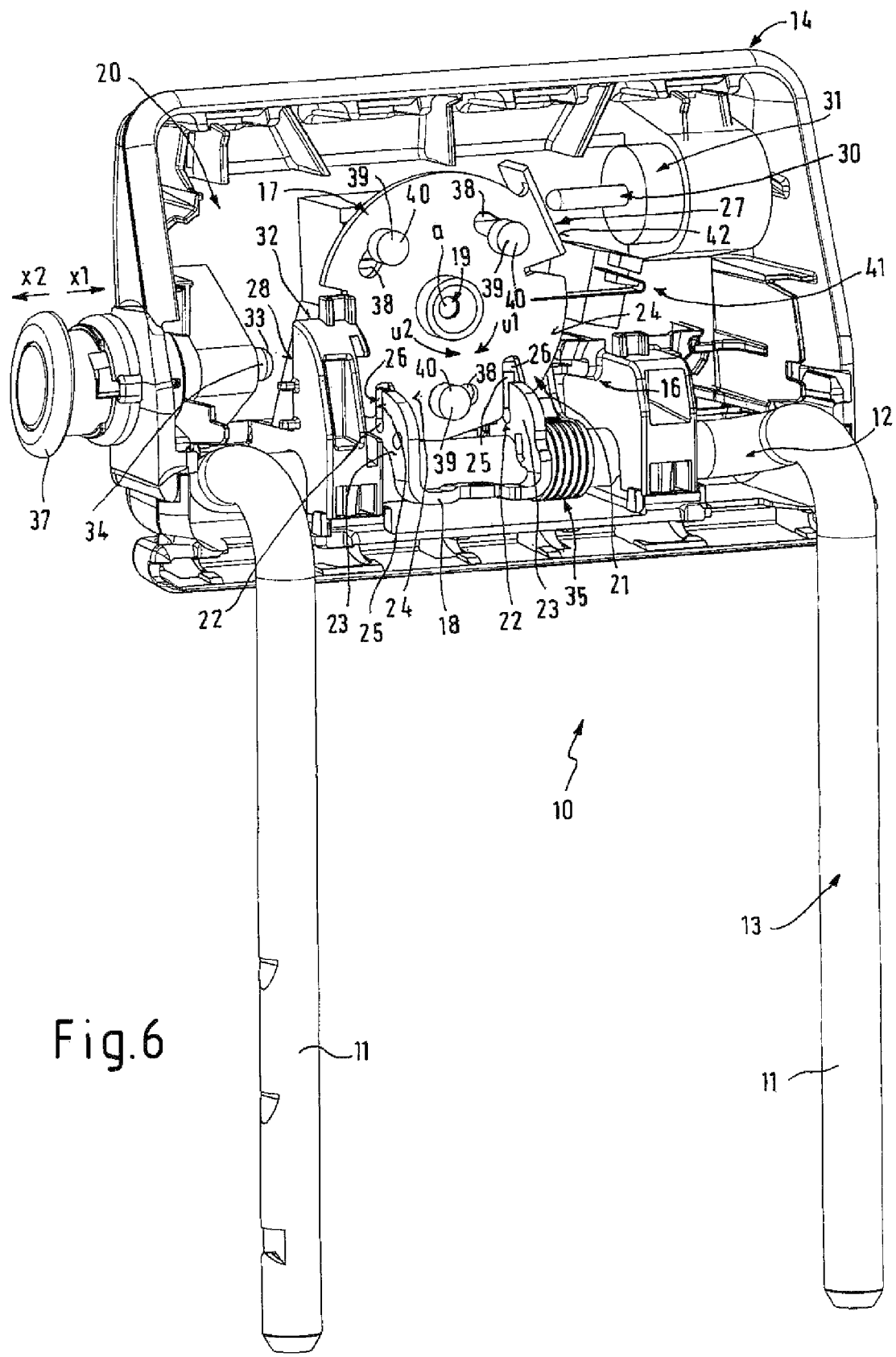
FIG. 6 is a view like FIG. 5, but with the cushion support unlatched.

By pivoting of the latch element 17 according to FIG. 5 in direction u2, the outer surfaces 24 of the latch element 17 according to FIG. 6 disengage the counter surfaces 26 of the arms 23. In the released position of the latch element 17 according to FIG. 6, openings or slots 26 between and defining the latch-element segments 21 are aligned with the counter surfaces 25 of the arms 23. Since in the position of the latch element 17 according to FIG. 6 the counter surfaces 25 of the restraining arms 23 are no longer in the path of motion of the latch element 17, the cushion support 14 is able to pivot about the rotation axis b (see FIG. 3). In the released position of the latch element 17, the cushion support 14 is pivoted backward by a torsion spring 35, from the use position according to FIG. 3 to the stowage position according to FIG. 4. Alternatively, according to another illustrated embodiment not illustrated, the cushion support may also be pivoted forward in direction v2.

The latch element 17 is biased by a spring 41 (FIGS. 5 and 6) in the pivot direction u1. After the cushion support 14 has pivoted against the force of the spring 35 from the stowage position according to FIG. 4 to the use position, when the cushion support 14 is in the use position according to FIG. 5 the latch element 17 is thus pivoted by the spring element 41 in direction u1 into the latched position described above. Thus if the user pivots up the headrest 10 it will automatically latch in the use position.

To transmit large forces such as those acting on the cushion support 14 in a collision, the latch element 17 has angularly extending and axially throughgoing holes 38 positioned radially outward around the axis a and each accommodating a respective pin 39 that is fixed to the cushion support 14. Each such hole 38 has an enlarged head 40 that bears axially on and securely hold the latch element 17 in the position illustrated in FIG. 5, even under high stresses. The slots 38 allow the latch element 17 to pivot between the latched position and the released position. Instead of pins, molded parts directly or indirectly attached to the head box may also be used to support the latch element. The molded parts may, for example, have slide faces that cooperate with the axial faces of the latch element 17.

To allow the latch element 17 to pivot in direction u2. into the released position, the latch element 17 has angularly offset actuating segments 27 and segment 28. The actuating segment 27 has a face 42 that cooperates with a plunger 30 of a solenoid or electromagnet 31. The plunger 30 is therefore not fixed to the actuating segment 27, but instead is able to slide along the face 42. Moving the plunger 30 parallel to axis b in direction x2 according to FIG. 5 causes the latch element 17 to be moved against the force of the spring element 41 in a direction u2 into the released position. The cushion support 14 is then pivoted by the spring element 35 into the stowage position in the manner described above. The electromagnet 31 may be actuated from the instrument panel, for example, so that the cushion support 14 for a rear vehicle seat may also be pivoted by the driver into the stowage position.

The latch element 17 may also be manually pivoted into the released position by use of the pushbutton 37. The actuating segment 28 of the latch element 17 has a slide face 32 that cooperates with an end 33 of a slider 34 that itself is not fixed to the actuating segment 28, but instead the end face 33 is able to slide along the face 32. The slider 34 may be moved against the force of an unillustrated spring from the position of FIG. 5 in direction xl, with the end face 33 exerting a force on the slide face 32 of the latch element 17, causing the latch element 17 to pivot in direction u2 into the released position. When the pressure on the slider 34 is released, the slider is moved by the unillustrated spring back in opposite direction x2.

We claim:

1. A motor-vehicle headrest comprising:
    an upright rod having upper and lower ends;
    a cushion support having a front face and pivotal on the upper rod end about a generally horizontal support axis between a use position with the face generally vertical and an stowage position with the face generally horizontal;
    a stop fixed on the rod upper end and having a stop face;
    a pivot fixed to the cushion support and defining a disk axis that is generally horizontal in the use position and generally vertical in the stowage position; and
    a generally planar latch disk generally parallel to and spaced from the front face and generally perpendicular to and centered on the disk axis, the disk being pivotal about the disk axis between a retaining position axially engaging the stop face and preventing pivoting of the support and a freeing position clear of the stop and permitting pivoting of the support.

2. The motor-vehicle headrest defined in claim 1 wherein the latch disk has a generally circular outer edge.

3. The motor-vehicle headrest defined in claim 1 wherein the stop has a stop face engageable axially of the disk axis with an axial face of the disk.

4. The motor-vehicle headrest defined in claim 3 wherein the stop is formed with a slot having an edge forming the stop face and through which the disk engages.

5. The motor-vehicle headrest defined in claim 4 wherein the disk is also formed with at least one slot open at the outer edge and engaging over the stop in the freeing position.

6. The motor-vehicle headrest defined in claim 1, further comprising
    a spring urging the latch disk into the retaining position.

7. The motor-vehicle headrest defined in claim 1, further comprising:
    an actuating formation projecting radially of the disk axis from the latch disk; and
    an actuator engageable with the actuating formation for angularly displacing the latch disk from the retaining position into the freeing position.

8. The motor-vehicle headrest defined in claim 7 wherein the actuator is a solenoid.

9. The motor-vehicle headrest defined in claim 7 wherein the actuator is an externally accessible pushbutton.

10. The motor-vehicle headrest defined in claim 1 wherein there are two such upright rods spaced apart parallel to the support axis, the headrest having a crosspiece extending between the upper rod ends and along the support axis, the stop being fixed on the crosspiece.

11. The motor-vehicle headrest defined in claim 10 wherein the disk lies in the use position in a vertical plane above the crosspiece.

12. The motor-vehicle headrest defined in claim 11 wherein the pivot includes a mounting plate between the disk and the front face and fixed to the cushion support.

13. The motor-vehicle headrest defined in claim 1 wherein the latch disk has a center of mass generally at the disk axis.

* * * * *